US007242008B2

(12) United States Patent
Ecelberger et al.

(10) Patent No.: US 7,242,008 B2
(45) Date of Patent: Jul. 10, 2007

(54) BIPOLAR ION DETECTOR

(75) Inventors: Scott C. Ecelberger, Laurel, MD (US); Douglas L. Lewis, Sykesville, MD (US); Keith A. Soldavin, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 11/132,685

(22) Filed: May 19, 2005

(65) Prior Publication Data

US 2005/0258356 A1 Nov. 24, 2005

Related U.S. Application Data

(60) Provisional application No. 60/572,523, filed on May 19, 2004.

(51) Int. Cl.
*B01D 59/44* (2006.01)

(52) U.S. Cl. ...................... 250/397; 250/281; 250/299; 250/287

(58) Field of Classification Search ..................... None
See application file for complete search history.

(56) References Cited

U.S. PATENT DOCUMENTS 5,326,978 A * 7/1994 Aebi et al. .................. 250/397
6,492,657 B1 * 12/2002 Burlefinger et al. .......... 257/10
6,828,729 B1 12/2004 Owens et al.
6,958,474 B2 * 10/2005 Laprade et al. ............. 250/287

OTHER PUBLICATIONS

"Microchannel Plates and Microchannel Plate Detectors," Del Mar Ventures, San Diego, CA, www.sciner.com/MCP/MCP.htm, May 16, 2005.
"Time-of-Flight Detectors," Burle Industries, Inc., www.burle.com/tofadvdet.htm, May 16, 2005.

* cited by examiner

*Primary Examiner*—Jack I. Berman
*Assistant Examiner*—Zia R. Hashmi
(74) *Attorney, Agent, or Firm*—Benjamin Y. Roca

(57) ABSTRACT

The present invention is directed to a bipolar ion detector capable of detecting both positive and negative ions in a single configuration. The invention uses either a single microchannel plates or a stack of microchannel plates to convert the ion signal into an amplified electron signal. Circuitry allows the anode to be biased (floated) to a positive high voltage and efficiently couple the signal from the anode out to recording electronics at ground.

2 Claims, 5 Drawing Sheets

BIPOLAR ION DETECTOR

CROSS-REFERENCE TO RELATED APPLICATIONS

This application is related to U.S. Provisional Application No. 60/572,523, entitled "Bipolar Ion Detector," filed on May 19, 2004, which is incorporated herein by reference in its entirety.

BACKGROUND OF THE INVENTION

1. Field of the Invention

The present invention relates to a bipolar ion detector. More specifically, it relates to a bipolar ion detector capable of detecting both positive and negative energetic ions in a single configuration, without the need to change the electrical configuration, or use electro-optical isolation, to switch from detecting one polarity to detecting the other.

2. Description of the Related Art

A microchannel plate (MCP) detector consists of a two-dimensional array of very small diameter glass capillaries or channels, also called pores, which are fused together and sliced into a thin plate. A single incident particle, which may be an ion, electron, photon, etc., enters a channel. Upon impact with a channel wall, the collision dislodges an electron. The dislodged electrons are accelerated by an electric field developed by a voltage applied across both ends of the MCP. They travel until they strike the channel wall, thus producing more secondary electrons, with the cascade process yielding a cloud of several thousand electrons, which emerge from the rear of the plate. If two or more MCPs are operated in succession, a single input event will generate 100 million or more electrons at the output. The output signals are detected in a number of ways, including metal or multimetal anodes, resistive anode, wedge and strip anode, delay-line readout, and others.

Such standard MCP ion detectors are typically used to detect positive ions, due to the way in which they are electrically biased. For positive ions, the collection anode can be at ground potential which makes it very easy to electrically couple to high speed electronics. For negative ions, the entire analyzer has to be floated to high negative voltage or the anode must be floated to a high positive voltage (or a combination of both). Neither of these methods is easy to implement, thus stimulating a need to modify this design for the detection of both positive and negative ions.

In order to detect both positive and negative ions in a single detector, present technology utilizes electro-optical isolation. In this approach, ions enter the detector through a wire mesh grid where they are generally post-accelerated into the face of a MCP. The MCP serves to convert the ions into electrons. The primary electrons are multiplied as they move down the pores of the MCP where the gain is controlled by the voltage difference across the MCP. The electrons exit the MCP and are further accelerated by an electric field into a scintillator plate. The scintillator plate serves to convert the electrons into photons, where the gain of the conversion process is controlled by the voltage difference between the scintillator plate and the rear of the MCP. Then the photons are detected by a photomultiplier tube (PMT), with the gain on the PMT being controlled by the voltage applied to the PMT.

While these ion detectors accomplish their intended purpose, they suffer from a number of drawbacks. For the first standard MCP detector described above, it is necessary to change the electrical bias of the detector in order to switch between detection of positive and negative ions. The second technique of electro-optical isolation requires an intermediate step of using a scintillator plate to convert the ions into photons, then directs the photons into a PMT, which converts the photons back to electrons at ground potential. The hardware necessary to do this usually adds undesirable complexity, weight and length to the detector.

A related aspect of these designs is the use of post-acceleration to draw the ions into the front face of the MCP. The use of post acceleration makes it necessary to change the electrical configuration of the unit to accommodate the detection of positive and negative ions.

In order to overcome these problems, what is needed is a bipolar ion detector, which permits direct conversion of the ion signal into an amplified electron signal, without the need for changing the electrical bias or using electro-optical isolation, thus addressing and solving problems associated with conventional systems.

SUMMARY OF THE INVENTION

The present invention is directed to a bipolar ion detector capable of detecting both positive and negative ions in a single configuration. The invention uses either a single microchannel plate or a stack of microchannel plates to convert the ion signal into an amplified electron signal. Circuitry allows the anode to be biased (floated) to a positive high voltage and efficiently couple the signal from the anode out to recording electronics at ground.

It is one object of the invention disclosed herein to provide a new and improved bipolar ion detector, which provides novel utility and flexibility through the use of a unique design which eliminates the need to convert the ion signal into photons and then back into an amplified signal.

It is another object of the invention disclosed herein to provide a new and improved bipolar ion detector, which does not require the analyzer or the anode to be floated, in order to change from detection of positive to negative particles, thereby proving greater ease of operation.

It is an advantage of the invention disclosed herein to provide a new and improved bipolar ion detector, which allows both positive and negative ions to strike the MCP, and does not require using an entrance grid or post-acceleration.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF EXEMPLARY EMBODIMENTS

Figure 1:
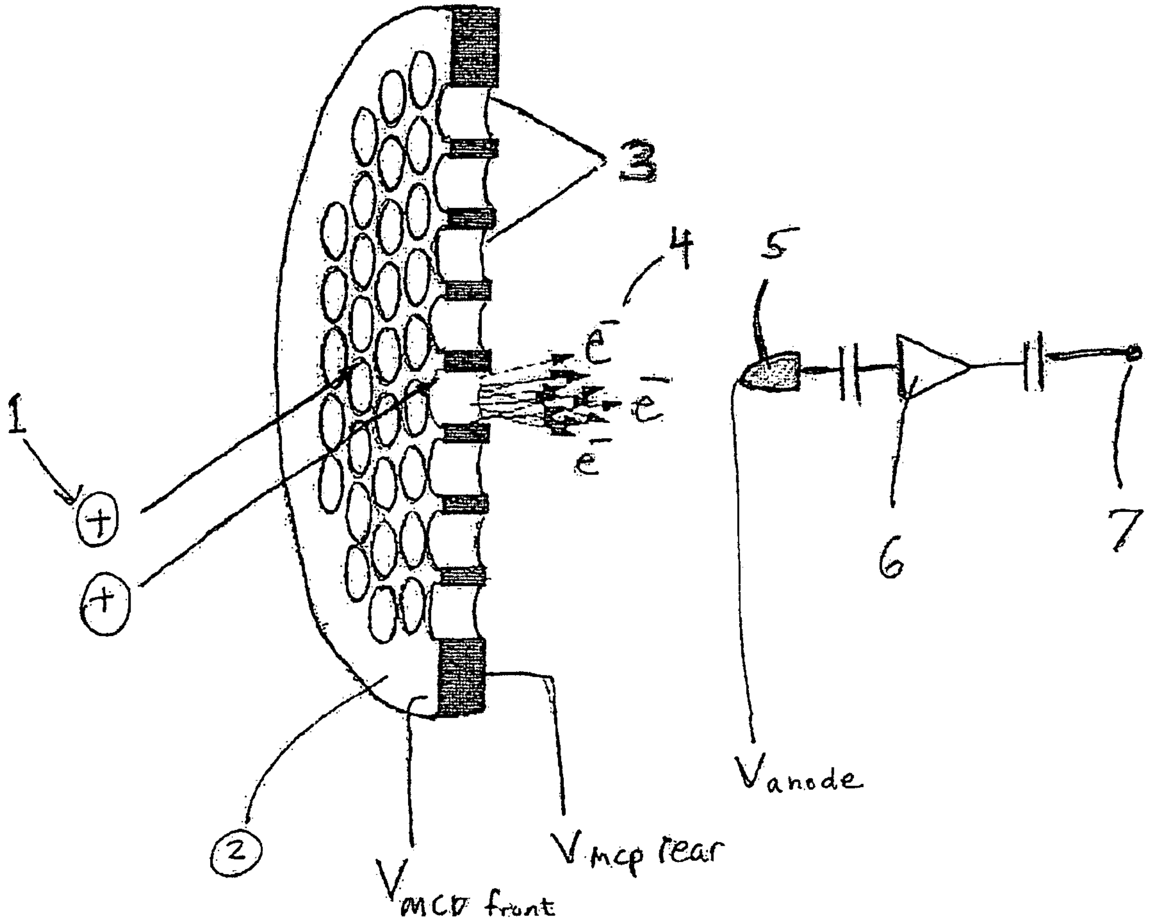
FIG. 1 is a cross-sectional view of example of a bipolar ion detector according to the principles of the present application.
Figure 2:
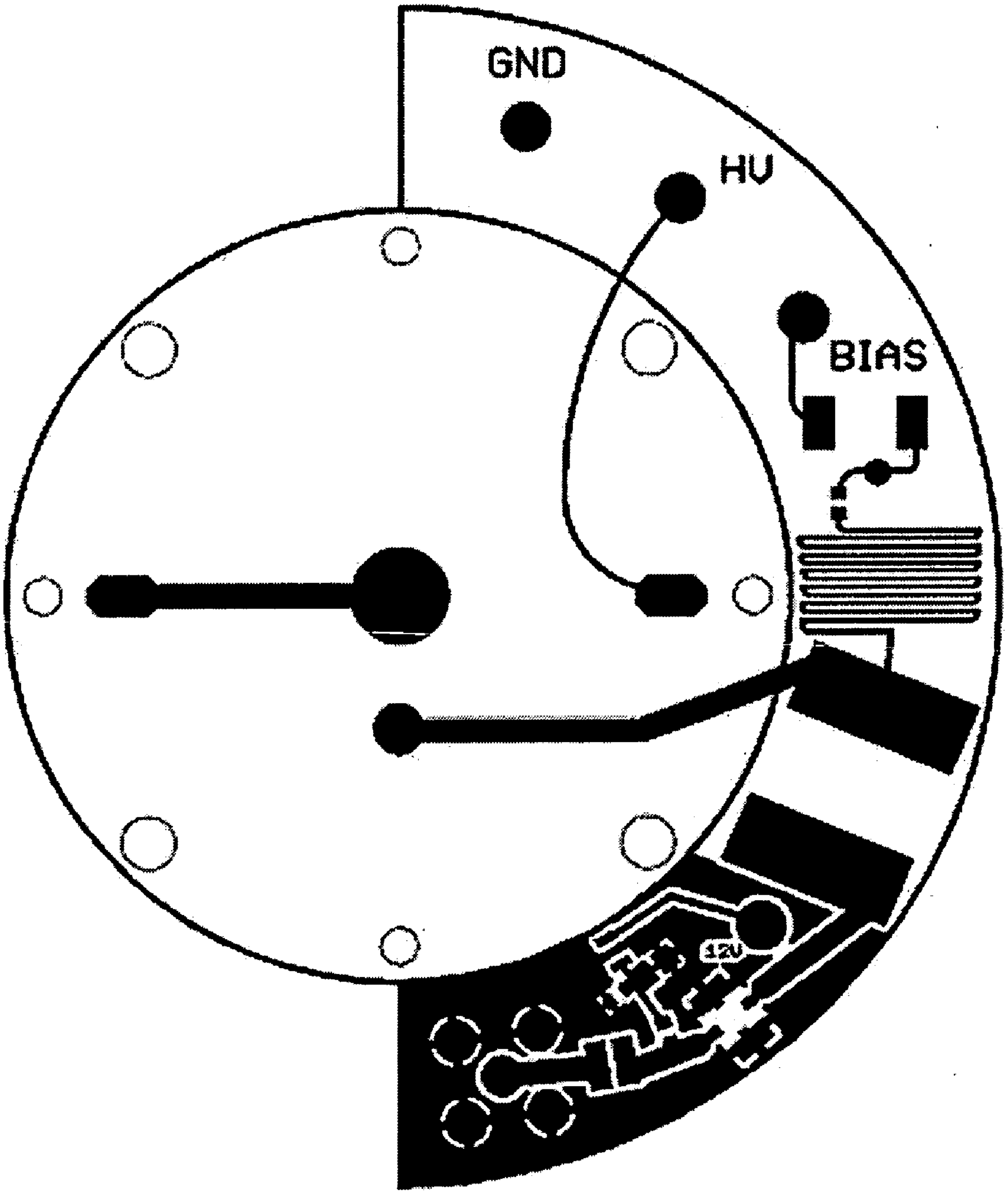
FIG. 2 is an example of a bipolar ion detector according to the principles of the present application.
Figure 3:
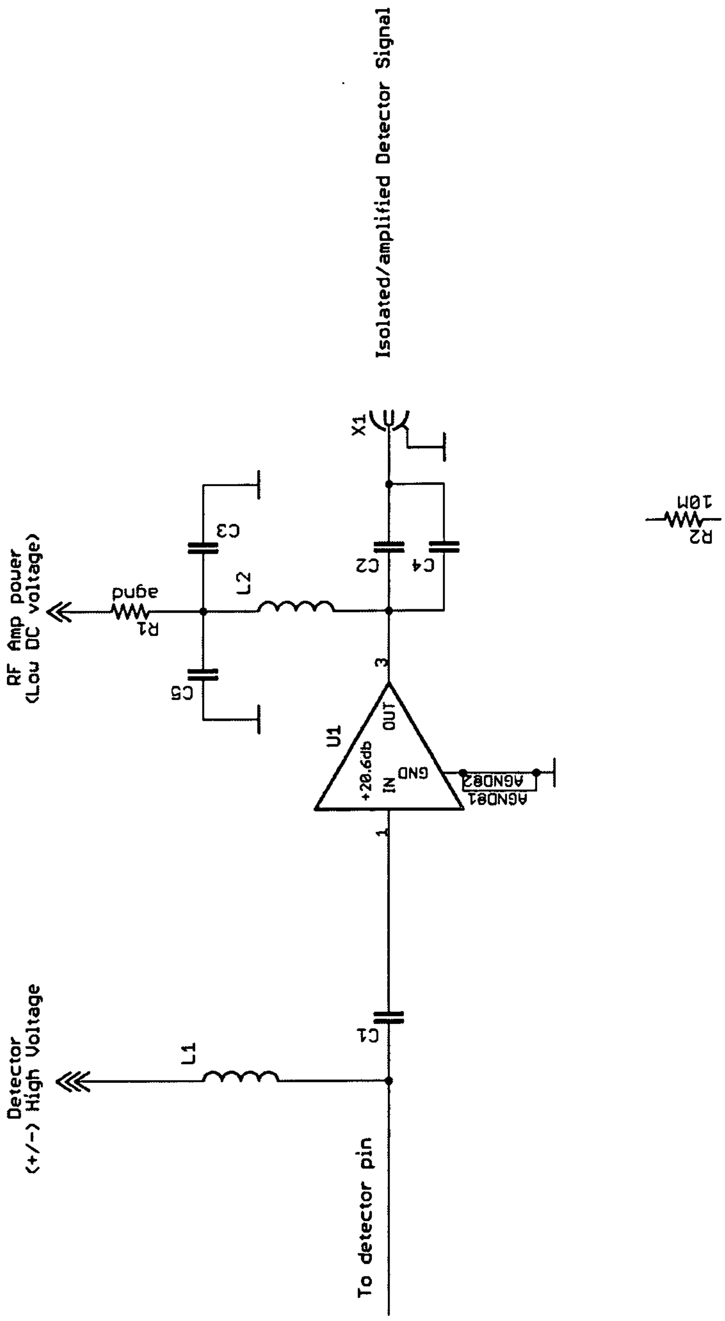
FIG. 3 is an example of the circuitry associated with a bipolar ion detector according to the principles of the present application.
Figure 4:
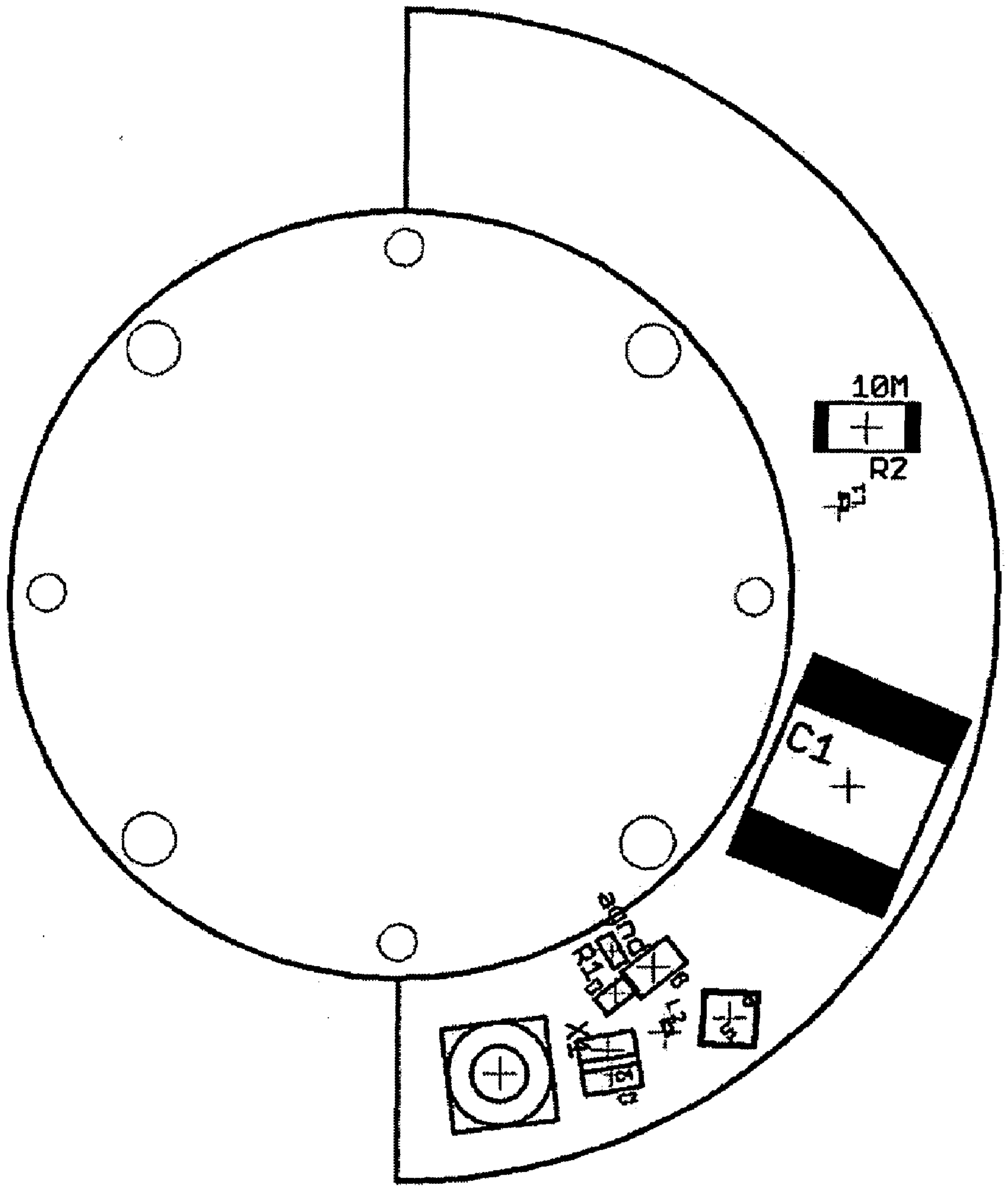
FIG. 4 is another example of a bipolar ion detector according to the principles of the present application.
Figure 5:
FIG. 5 is an exploded view of an example of a bipolar ion detector according to the principles of the present application.

Referring now to the drawings in greater detail, FIG. 1 shows a cross-sectional view of one embodiment according to the principles of the present invention. MCP 2 contains channels 3. The front face of MCP 2 is held at ground potential, denoted as $V_{mcp\ front}$. The rear face of MCP 2 is held at a slightly higher voltage than the front face of MCP 2, here denoted by $V_{mcp\ rear}$. The principle is that $V_{mcp\ rear}$ is chosen to produce the desired gain. Collection anode 5 is positioned in proximity to the rear face of MCP 2, and electrically biased higher than the rear face of MCP 2, the bias voltage denoted by $V_{anode}$. Collection anode 5 connects to circuitry which includes an AC coupled broad band amplifier 6 and further circuitry, denoted by item 7, which includes high voltage isolation components which couple the signal to a transmission line at ground potential. At this point, with the signal being at ground, the signal may be digitized through the use of conventional techniques.

As an illustrative example, the front face of MCP 2 may be held at ground potential, and the rear face of MCP 2 at +2 kV. Collection anode 5 may biased approximately +500V higher than the rear face of MCP plate 2, that is, at +2.5 kV for this example. Clearly, the precise voltages used will be dependent on the gain desired and may differ from the present example without departing from the principles of the present application.

Note that while FIG. 1 illustrates a single MCP, the principles of the present application apply equally well to a plurality of MCPs in a stacked arrangement. Such an arrangement may be used to generate a larger electric flux than a single MCP. In such a case the same principles apply as in the single MCP case, with the rear face of the MCP in the rear of the stack being held at a voltage sufficient to draw the electrons the length of the stack, and the collection anode biased at a higher voltage.

In order to use the present invention, the operator positions an ion source in close proximity to the front face of MCP 2. Since the front of MCP 2 is held at ground potential, either positive or negative ions may be used. Ions 1 pass through channels 3, and in so doing ions 1 collide with the walls of channels 3. These collisions results in displacing electrons from the walls of channels 3, which in turn collide and displace even more electrons. Since the rear of the MCP 2 is held at a slightly higher voltage, the displaced electrons are drawn to the rear of the MCP 2. The resultant cascade of electrons exits from channels 3 at the rear face of MCP plate 2. Upon exiting MCP 2, the electrons are drawn toward collection anode 5, which is held at a yet higher voltage than the rear of the MCP. At anode 5, an electrical signal is generated and passes through analyzer circuitry. The analyzer circuitry may include an AC coupled broad band amplifier and high voltage isolation components which couple the signal to a transmission line at ground potential. At this point, as the signal is at ground, the signal may be digitized through conventional techniques.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. An ion detector comprising:

a microchannel plate having a front surface and a rear surface, wherein said microchannel plate generates electrons in response to the impact of an ion on said front surface;

first biasing means for electrically biasing said rear of said microchannel plate;

detecting means for detecting said electrons;

second biasing means for electrically biasing said detecting means;

generating means for generating a signal representative of the energy of said ion, said generating means being electrically connected to said detecting means; and coupling means for coupling the signal out at ground potential, wherein said detecting means includes an anode located in proximity to the rear surface of the microchannel plate, wherein said generating means includes a analyzer circuitry connected to said anode, wherein said rear surface of said microchannel plate is biased to a positive voltage, and said anode is biased to a positive voltage higher than the positive voltage of the rear surface of said microchannel plate, wherein said rear surface of said MCP is biased to 2kV, and said anode is biased to 2.5 kV.

2. A method of detecting a flux of ions, comprising the steps of:

placing a microchannel plate in the path of the ions, applying bias voltage to the microchannel plate to generate an electron beam output from the ion input impacted on a surface of the microchannel plate;

focusing the electron beam output onto a collector anode; and generating an electrical signal proportional to the flux of the ion input, whereby said electron beam is focused onto the collector anode by electrically biasing said anode at a voltage higher than that of said rear of said MCP, whereby said electrical signal is generated by connecting analyzer circuitry to said anode.

* * * * *